United States Patent
Wang et al.

(10) Patent No.: US 9,860,817 B2
(45) Date of Patent: *Jan. 2, 2018

(54) METHOD AND APPARATUS FOR IMPLEMENTING TRACKING AREA UPDATE AND CELL RESELECTION IN A LONG TERM EVOLUTION SYSTEM

(71) Applicant: INTERDIGITAL TECHNOLOGY CORPORATION, Wilmington, DE (US)

(72) Inventors: Peter S. Wang, E. Setauket, NY (US); James M. Miller, Verona, NJ (US); Ulises Olvera-Hernandez, Kirkland (CA)

(73) Assignee: InterDigital Technology Corporation, Wilmington, DE (US)

( * ) Notice: Subject to any disclaimer, the term of this patent is extended or adjusted under 35 U.S.C. 154(b) by 498 days.

This patent is subject to a terminal disclaimer.

(21) Appl. No.: 14/100,891

(22) Filed: Dec. 9, 2013

(65) Prior Publication Data
US 2014/0092871 A1    Apr. 3, 2014

Related U.S. Application Data

(63) Continuation of application No. 11/923,033, filed on Oct. 24, 2007, now Pat. No. 8,649,291.
(Continued)

(51) Int. Cl.
*H04W 36/34* (2009.01)
*H04W 60/04* (2009.01)
*H04W 8/18* (2009.01)

(52) U.S. Cl.
CPC .......... *H04W 36/34* (2013.01); *H04W 60/04* (2013.01); *H04W 8/18* (2013.01)

(58) Field of Classification Search
None
See application file for complete search history.

(56) References Cited

U.S. PATENT DOCUMENTS 7,174,184 B2 * 2/2007 Mahkonen et al. .......... 455/522
7,308,258 B2   12/2007 Demir et al.
(Continued)

FOREIGN PATENT DOCUMENTS

CN    1663166 A    8/2005
CN    1691670 A    11/2005
(Continued)

OTHER PUBLICATIONS

3rd Generation Partnership Project; TS 24.008 V7.5.0, "Technical Specification Group Core Network and Terminals; Mobile radio interface Layer 3 specification; Core network protocols; Stage 3 (Release 7)", Sep. 2006, 538 pages.
(Continued)

*Primary Examiner* — Chirag Shah
*Assistant Examiner* — Amar Persaud
(74) *Attorney, Agent, or Firm* — Condo Roccia Koptiw LLP

(57) ABSTRACT

The invention performs long term evolution (LTE) tracking area updates (TAUs), and tracking area code (TAC) and public land mobile network identification (PLMN-ID) assisted optimized wireless transmit/receive unit (WTRU) cell reselection. An evolved Node-B broadcasts system information including at least one system information block (SIB) based at least in part on an enhanced universal terrestrial radio access network (E-UTRAN) parameter response message sent by an evolved packet core (EPC) network. A WTRU generates a new TAC, which represents a tracking area identification (TA-ID) of a new cell, based on the system information, and compares the new TAC to an
(Continued)

existing TAC, which represents a TA-ID of a previous cell. The WTRU transmits to the EPC network a TAU request message including the TA-ID of the new cell. The EPC network sends either a TAU accept message or a TAU reject message to the WTRU.

10 Claims, 3 Drawing Sheets

Related U.S. Application Data

(60) Provisional application No. 60/863,528, filed on Oct. 30, 2006.

(56) References Cited

U.S. PATENT DOCUMENTS

| | | | |
|---|---|---|---|
| 8,583,118 | B2 | 11/2013 | Lee |
| 2003/0040314 | A1* | 2/2003 | Hogan et al. ............... 455/435 |
| 2003/0153271 | A1 | 8/2003 | Brandt et al. |
| 2004/0072578 | A1* | 4/2004 | Keutmann et al. ........ 455/456.1 |
| 2005/0070283 | A1 | 3/2005 | Hashimoto et al. |
| 2005/0107110 | A1 | 5/2005 | Vasudevan et al. |
| 2005/0232209 | A1 | 10/2005 | Buckley et al. |
| 2005/0239461 | A1* | 10/2005 | Verma et al. ............... 455/435.1 |
| 2005/0243786 | A1 | 11/2005 | Bae et al. |
| 2006/0084443 | A1 | 4/2006 | Yeo et al. |
| 2007/0037577 | A1* | 2/2007 | Dalsgaard et al. ........... 455/436 |
| 2007/0097983 | A1* | 5/2007 | Nylander et al. .......... 370/395.2 |
| 2008/0019320 | A1* | 1/2008 | Phan et al. ................. 370/331 |
| 2009/0061878 | A1* | 3/2009 | Fischer ....................... 455/436 |
| 2012/0243436 | A1 | 9/2012 | Hind et al. |

FOREIGN PATENT DOCUMENTS

| | | |
|---|---|---|
| JP | 2005-109570 A | 4/2005 |
| JP | 2006-505158 A | 2/2006 |
| JP | 2006-514818 A | 5/2006 |
| JP | 2007-251586 A | 9/2007 |
| JP | 2008-517545 A | 5/2008 |
| KR | 10-2006-0044677 A | 5/2006 |
| KR | 10-2006-0105781 A | 10/2006 |
| WO | WO 2004/040931 A2 | 5/2004 |
| WO | WO 2004/066543 A2 | 8/2004 |
| WO | WO 2005/053304 A2 | 6/2005 |
| WO | WO 2006/104752 A1 | 3/2006 |
| WO | WO 2006/043131 A1 | 4/2006 |

OTHER PUBLICATIONS

3$^{rd}$ Generation Partnership Project, "3GPP TS 25.311 V7.2.0" Sep. 2006, pp. 462-480.
3rd Generation Partnership Project (3GPP), TDoc R2-052908, "Network Sharing for LTE", Siemens, 3GPP Joint TSG RAN WG2-WG3 Meeting #49, Seoul, Korea, Nov. 7-11, 2005, 2 pages.
3rd Generation Partnership Project (3GPP), R2-052910, "Roaming/Area Restrictions for LTE ", Siemens, 3GPP Joint TSG RAN WG2-WG3 Meeting #49, Seoul, Korea, Nov. 7-11, 2005, 3 pages.
3rd Generation Partnership Project (3GPP), Rx-062751, "System Information Classification", Nokia, 3GPP TSG-RAN WG2 Meeting #55, Seoul, South-Korea, Oct. 9-13, 2006, 7 pages.
3rd Generation Partnership Project (3GPP), S2-062096, "Tracking Area Concept", Ericsson, 3GPP TSG SA WG2 Architecture-S2 #53, Jun. 26-30, 2006, pp. 1-5.
3rd Generation Partnership Project (3GPP), TR 23.882 V8.0.0, "Technical Specification Group Services and System Aspects, 3GPP System Architecture Evolution, Report on Technical Options and Conclusions, (Release 8)", Sep. 2008, 234 pages.
3rd Generation Partnership Project (3GPP), TR 25.912 V7.1.0, "Technical Specification Group Radio Access Network, Feasibility Study for Evolved Universal Terrestrial Radio Access (UTRA) and Universal Terrestrial Radio Access Network (UTRAN) (Release 7)", Sep. 2006, 57 pages.
3rd Generation Partnership Project (3GPP), TS 23.003 V7.1.0, "Technical Specification Group Core Network and Terminals, Numbering, Addressing and Identification (Release 7)", Sep. 2006, 51 pages.
3rd Generation Partnership Project (3GPP), TS 24.008 V7.5.0, "Technical Specification Group Core Network and Terminals, Mobile Radio Interface Layer 3 Specification, Core Network Protocols; Stage 3 (Release 7)", Sep. 2006, 538 pages.
3rd Generation Partnership Project (3GPP), TS 25.304 V7.2.0, "Technical Specification Group Radio Access Network, User Equipment (UE) Procedures in Idle Mode and Procedures for Cell Reselection in Connected Mode (Release 7)", Jun. 2007, 41 pages.
3rd Generation Partnership Project (3GPP), TS 25.331 V3.21.0, "Technical Specification Group Radio Access Network, Radio Resource Control (RRC), Protocol Specification (Release 1999)", Dec. 2004, 879 pages.
3rd Generation Partnership Project (3GPP), TS 25.331 V7.5.0, "Technical Specification Group Radio Access Network, Radio Resource Control (RRC), Protocol Specification (Release 7)", Jun. 2007, 1429 pages.
3rd Generation Partnership Project (3GPP), TS 25.331 V4.17.0, "Technical Specification Group Radio Access Network, Radio Resource Control (RRC), Protocol Specification (Release 4)", Mar. 2005, 953 pages.
3rd Generation Partnership Project (3GPP), TS 25.331 V5.19.0, "Technical Specification Group Radio Access Network, Radio Resource Control (RRC), Protocol Specification (Release 5)", Dec. 2006, 1045 pages.
3rd Generation Partnership Project (3GPP), TS 25.331 V6.14.0, "Technical Specification Group Radio Access Network, Radio Resource Control (RRC), Protocol Specification (Release 6)", Jun. 2007, 1247 pages.
3rd Generation Partnership Project (3GPP), TR 23.882 V1.2.3, "Technical Specification Group Services and System Aspects, 3GPP System Architecture Evolution: Report on Technical Options and Conclusions (Release 7)", Jun. 2006, 127 pages.
3rd Generation Partnership Project (3GPP), TS 25.331 V6.8.0, "Technical Specification Group Radio Access Network, Radio Resource Control (RRC), Protocol Specification (Release 6)", Dec. 2005, 1174 pages.
3rd Generation Partnership Project (3GPP), R2-063037, "System Information Classification", Nokia, 3GPP TSG-RAN WG2 Meeting #55, Seoul, South-Korea, Oct. 9-13, 2006, 7 pages.
3rd Generation Partnership Project (3GPP), TR 23.882 V1.11.0, "Technical Specification Group Services and System Aspects, 3GPP System Architecture Evolution: Report on Technical Options and Conclusions (Release 7)", Jul. 2007, 211 pages.
3rd Generation Partnership Project (3GPP), TR 23.882 V1.4.2, "Technical Specification Group Services and System Aspects, 3GPP System Architecture Evolution: Report on Technical Options and Conclusions (Release 7)", Oct. 2006, 160 pages.
3rd Generation Partnership Project (3GPP), TR 23.882 V1.9.0, "Technical Specification Group Services and System Aspects, 3GPP System Architecture Evolution: Report on Technical Options and Conclusions (Release 7)", Mar. 2007, 184 pages.
3rd Generation Partnership Project (3GPP), TR 25.912 V7.2.0, "Technical Specification Group Radio Access Network, Feasibility study for Evolved Universal Terrestrial Radio Access (UTRA) and Universal Terrestrial Radio Access Network (UTRAN) (Release 7)", Jun. 2007, 65 pages.
3rd Generation Partnership Project (3GPP), TS 25.304 V7.0.0, "Technical Specification Group Radio Access Network, User Equipment (UE) Procedures in Idle Mode and Procedures for Cell Reselection in Connected Mode (Release 7)", Mar. 2006, 38 pages.
3rd Generation Partnership Project (3GPP), TS 25.331 V5.18.0, "Technical Specification Group Radio Access Network, Radio Resource Control (RRC), Protocol Specification (Release 5)", Sep. 2006, 1045 pages.

(56) References Cited

OTHER PUBLICATIONS

3rd Generation Partnership Project (3GPP), TS 25.331 V6.11.0, "Technical Specification Group Radio Access Network, Radio Resource Control (RRC), Protocol Specification (Release 6)", Sep. 2006, 1248 pages.

3rd Generation Partnership Project (3GPP), TS 25.331 V7.2.0, "Technical Specification Group Radio Access Network, Radio Resource Control (RRC), Protocol Specification (Release 7)", Sep. 2006, 1306 pages.

3rd Generation Partnership Project (3GPP), S2-062333, "Tracking Area Principles", Nokia, 3GPP TSG SA WG2 Architecture-52 #53, Lisbon, Portugal, Jun. 26-30, 2006, 3 pages.

$3^{rd}$ Generation Partnership Project (3GPP), Rx-062751, "System Information classification", Nokia, TSG-RAN WG2, Meeting # 55, Seoul, South-Korea, Oct. 9-13, 2006, 7 pages.

$3^{rd}$ Generation Partnership Project (3GPP), R2-062265, "System Information for the LTE", Samsung, 3GPP TSG RAN2#54, Tallinn, Estonia, Aug. 28-Sep. 2, 2006, 2 pages.

3rd Generation Partnership Project (3GPP), R3-061593, "Tracking Area Concept for LTE/SAE (Revision of R3-061542)", Siemens, 3GPP TSG RAN WG3 Meeting #53bis, Seoul, Korea, Oct. 10-13, 2006, 5 pages.

\* cited by examiner

FIG. 4

| | BIT 8 | BIT 7 | BIT 6 | BIT 5 | BIT 4 | BIT 3 | BIT 2 | BIT 1 | OCTET POSITION | PRESENCE AND SEMANTICS |
|---|---|---|---|---|---|---|---|---|---|---|
| | TRACKING AREA IDENTIFICATION IE-ID ||||||||  OCTET 1 | MP |
| | MCC DIGIT 2 |||| MCC DIGIT 1 |||| OCTET 1+x*1 | OP (IF PLMN IS PRESENT x=1, ELSE x=0) |
| | MNC DIGIT 3 |||| MCC DIGIT 3 |||| OCTET 1+x*2 | |
| | MNC DIGIT 2 |||| MNC DIGIT 1 |||| OCTET 1+x*3 | |
| | TAC |||||||| OCTET 2+x*3 | MP |
| | TAC (CONTINUED) |||||||| OCTET 3+x*3 | MP |
| | TAC (CONTINUED IF 24-BIT TAC USED) |||||||| OCTET 4+x*3 | OP |

FIG. 5

| INFORMATION ELEMENT NAME/GROUP NAME | NEED | MULTI | TYPE AND REFERENCE | SEMANTICS |
|---|---|---|---|---|
| SERVING CELL IDENTITY | MP | | CELL IDENTITY X.X.X.X | |
| TRACKING AREA CODE LIST ASSOCIATED WITH THE SERVING CELL | MP | 1 TO <maxTAsToACell> | TRACKING AREA CODE X.X.X.Y | ONE FOR "MULTIPLE TAs REGISTRATION", MULTIPLE FOR "OVERLAPPING TAs". |
| E-UTRAN MOBILITY AREA INFORMATION WITH NEIGHBORING CELLS | OP | | | |
| >NEIGHBOR CELL ID | OP | | CELL IDENTITY X.X.X.X | THE LIST IS SORTED WITH THE CELLS WHOSE TA-ID(s) APPEARED IN THE "TRACKING AREA CODE LIST ASSOCIATED WITH THE SERVING CELL". |
| >PLMN IDENTITY | OP | | PLMN IDENTITY X.X.Y.X | IF NOT PRESENT, USE THE PLMN-ID BEFORE IN THE LIST. |
| >TRACKING AREA CODE ASSOCIATED WITH THE CELL | OP | 1 TO <maxTAsToACell> | TRACKING AREA CODE X.X.X.Y | |

METHOD AND APPARATUS FOR IMPLEMENTING TRACKING AREA UPDATE AND CELL RESELECTION IN A LONG TERM EVOLUTION SYSTEM

CROSS REFERENCE TO RELATED APPLICATION

This application is a continuation of U.S. patent application Ser. No. 11/923,033, filed Oct. 24, 2007, which claims the benefit of U.S. Provisional Application No. 60/863,528 filed Oct. 30, 2006, which is incorporated by reference as if fully set forth.

FIELD OF INVENTION

The invention is related to wireless communication systems.

BACKGROUND

The third generation partnership project (3GPP) has recently initiated the long term evolution (LTE) program to bring new technology, new network architecture, new configuration, and new applications and services to the wireless cellular network in order to provide improved spectral efficiency and faster user experiences. One new item adopted by the LTE program is the mobility tracking area concept, which replaces the former third generation (3G) universal mobile telecommunications system (UMTS) system's location area (LA), registration area (RA) and universal terrestrial radio access network (UTRAN) registration area (URA).

There is only one common tracking area concept defined for radio access network (RAN) and core network (CN) in LTE/system architecture evolution (SAE). The location of an LTE wireless transmit/receive unit (WTRU) that is in an idle state (LTE_IDLE) is known by the network on a tracking area granularity. The goal is to reduce the mobility area management complexities and to reduce the related signaling overhead for the mobility area update whereby, instead of using both the RA/LA and the URA for UMTS, only a tracking area (TA) is used for LTE.

Prior to LTE, due to the second generation (2G) legacy, the 3G UMTS mobility area management has a location area, which includes one or more routing areas. The 3G UMTS also has a URA, which covers one or more UMTS cells.

The mobility management involves the URA update, which is administered by a radio resource control (RRC) unit, and the routing area update (RAU) which is administered by the general packet radio service (GPRS) mobility manager (GMM) at the non-access stratum (NAS) protocol stack. The WTRU URA update is triggered by the matching of the current URA identification (URA-ID) with the cell-published URA-ID contents in UMTS system information block (SIB) type 2 (SIB-2). The RAU is triggered by the changing of any one of the public land mobile network identification (PLMN-ID), the location area code (LAC) and the routing area code (RAC). Note that both the LAC and the RAC are published to the cell via SIB-1. The current 3GPP UMTS system information broadcast content is shown in the following Table 1.

TABLE 1

| System Information Block (SIB) | Area scope | WTRU mode/state when block is valid | WTRU mode/state when block is read | Scheduling Information | Modification of System Information | Additional Comment |
|---|---|---|---|---|---|---|
| Master information block | Cell | Idle mode, CELL_FACH, CELL_PCH, URA_PCH, CELL_DCH (TDD only) | Idle mode, CELL_FACH, CELL_PCH, URA_PCH, CELL_DCH (TDD only) | SIB_POS = 0 SIB_REP = 8 (FDD) SIB_REP = 8, 16, 32 (TDD) SIB_OFF = 2 | Value tag | |
| Scheduling block 1 | Cell | Idle mode, CELL_FACH, CELL_PCH, URA_PCH, CELL_DCH (TDD only) | Idle mode, CELL_FACH, CELL_PCH, URA_PCH, CELL_DCH (TDD only) | Specified by the IE "Scheduling information" in MIB | Value tag | |
| Scheduling block 2 | Cell | Idle mode, CELL_FACH, CELL_PCH, URA_PCH, CELL_DCH (TDD only) | Idle mode, CELL_FACH, CELL_PCH, URA_PCH, CELL_DCH (TDD only) | Specified by the IE "Scheduling information" in MIB | Value tag | |
| System information block type 1 | PLMN | Idle mode CELL_FACH, CELL_PCH, URA_PCH, CELL_DCH | Idle, CELL_FACH, CELL_PCH, URA_PCH | Specified by the IE "Scheduling information" | Value tag | |
| System information block type 2 | Cell | URA_PCH | URA_PCH | Specified by the IE "Scheduling information" | Value tag | |
| System information block type 3 | Cell | Idle mode, (CELL_FACH, CELL_PCH, URA_PCH) | Idle mode, (CELL_FACH, CELL_PCH, URA_PCH) | Specified by the IE "Scheduling information" | Value tag | |
| System information block type 4 | Cell | CELL_FACH, CELL_PCH, URA_PCH | CELL_FACH, CELL_PCH, URA_PCH | Specified by the IE "Scheduling information" | Value tag | If System information block type 4 is not broadcast in a cell, the |

TABLE 1-continued

| System Information Block (SIB) | Area scope | WTRU mode/state when block is valid | WTRU mode/state when block is read | Scheduling Information | Modification of System Information | Additional Comment |
| --- | --- | --- | --- | --- | --- | --- |
| | | | | | | connected mode WTRU shall apply information in System information block type 3 in connected mode. |
| System information block type 5 and 5bis | Cell | Idle mode, (CELL_FACH, CELL_PCH, URA_PCH, CELL_DCH (TDD only)) | Idle mode, (CELL_FACH, CELL_PCH, URA_PCH, CELL_DCH (TDD only)) | Specified by the IE "Scheduling information" | Value tag | System information block type 5bis is sent instead of system information block type 5 in networks that use Band IV. |
| System information block type 6 | Cell | CELL_FACH, CELL_PCH, URA_PCH, CELL_DCH (TDD only) | CELL_FACH, CELL_PCH, URA_PCH, CELL_DCH (TDD only) | Specified by the IE "Scheduling information" | Value tag | If system information block type 6 is not broadcast in a cell, the connected mode WTRU shall read System information block type 5. If some of the optional IEs are not included in System information block type 6, the WTRU shall read the corresponding IEs in System information block type 5 |
| System information block type 7 | Cell | Idle mode, CELL_FACH, CELL_PCH, URA_PCH, CELL_DCH (TDD only) | Idle mode, CELL_FACH, CELL_PCH, URA_PCH, CELL_DCH (TDD only) | Specified by the IE "Scheduling information" | Expiration timer = MAX(32, SIB_REP * ExpirationTime Factor) | |
| System information block type 11 | Cell | Idle mode (CELL_FACH, CELL_PCH, URA_PCH, CELL_DCH) | Idle mode (CELL_FACH, CELL_PCH, URA_PCH) | Specified by the IE "Scheduling information" | Value tag | |
| System information block type 12 | Cell | CELL_FACH, CELL_PCH, URA_PCH, CELL_DCH | Idle mode, CELL_FACH, CELL_PCH, URA_PCH | Specified by the IE "Scheduling information" | Value tag | If system information block type 12 is not broadcast in a cell, the connected mode WTRU shall read System information block type 11. If some of the optional IEs are not included in System information block type 12, the WTRU shall read the corresponding IEs in System information block type 11. |

TABLE 1-continued

| System Information Block (SIB) | Area scope | WTRU mode/state when block is valid | WTRU mode/state when block is read | Scheduling Information | Modification of System Information | Additional Comment |
|---|---|---|---|---|---|---|
| System information block type 13 | | | | | | ANSI-41 |
| System information block type 14 | | | | | | This system information block is used in 3.84 Mcps TDD mode only. |
| System information block type 15 | Cell | Idle Mode, CELL_FACH, CELL_PCH, URA_PCH | Idle Mode, CELL_FACH, CELL_PCH, URA_PCH | Specified by the IE "Scheduling information" | Value tag | |
| System information block type 16 | Equivalent PLMN | Idle Mode, CELL_FACH, CELL_PCH, URA_PCH, CELL_DCH | Idle Mode, CELL_FACH, CELL_PCH, URA_PCH | Specified by the IE "Scheduling information" | Value tag | For this system information block there may be multiple occurrences. This system information block is also valid while in GSM/GPRS. |
| System information block type 17 | | | | | | This system information block is used in TDD mode only. |
| System Information Block type 18 | Cell | Idle mode, CELL_FACH, CELL_PCH, URA_PCH, CELL_DCH | Idle mode, CELL_FACH, CELL_PCH, URA_PCH | Specified by the IE "Scheduling information" | Value tag | |

While the previously employed NAS RAU procedure and the RRC URA update procedure will no longer apply, a new LTE tracking area update (TAU) procedure and its related LTE SI, operating procedures and tasks in various protocol levels and system levels will have to be defined.

Given the conceptual and architectural change, the LTE system information will have to reflect these changes and also be organized to facilitate the optimization of better WTRU operation and overall system resource utilization.

SUMMARY

The invention performs LTE TAUs, and tracking area code (TAC) and PLMN-ID assisted optimized WTRU cell reselection. An evolved Node-B (eNodeB) broadcasts system information including at least one SIB based at least in part on an enhanced universal terrestrial radio access network (E-UTRAN) parameter response message sent by an evolved packet core (EPC) network. A WTRU processes a new TAC, which represents a tracking area identification (TA-ID) of a new cell, based on the system information, and compares the new TAC to an existing TAC, which represents a TA-ID of a previous cell. The WTRU transmits to the EPC network a TAU request message including the TA-ID of the new cell. The EPC network sends either a TAU accept message or a TAU reject message to the WTRU.

The invention associates and groups the LTE specific mobility tracking area identifications, cell identifications and the PLMN-IDs together as system information for coverage over the E-UTRAN cells deployed in the neighborhood of a specific LTE cell that broadcasts the system information. The invention also provides an optimized method for LTE WTRUs to perform cell measurement and cell reselection ranking by utilizing the LTE system information for achieving the least possible TAU signaling overhead in the WTRU LTE_IDLE state.

Furthermore, new LTE TA-IDs are constructed, and a new LTE SIB is provided that publishes the TA code/IDs to the serving cell, as well as to group neighboring cells, represented by their cell-IDs with PLMN-IDs and TACs for the purpose of WTRU cell reselection optimization.

By using WTRU procedures for handling the TA related system information, the GMM unit in the NAS can perform the checking of the TAs broadcast in the system information, which is forwarded to the NAS by the RRC unit, with its current TA allowance, to determine if a TA change triggered TAU is required. Alternatively, for implementation advantage, the RRC unit may also perform the above described TA checking and then notify the NAS protocol stack if a TAU is required.

TACs are used as criteria in the cell reselection candidate cell selection, measurement scheduling, and ultimate cell reselection ranking ordering. The purpose is to reselect to the proper cell without causing unnecessary TAU.

High level control of tracking areas in the NAS protocol stack (i.e., software) and UMTS subscriber identity module (USIM) device that "list of forbidden TAs" must be implemented for high level WTRU mobility control. Operations on the list of forbidden TAs are described.

BRIEF DESCRIPTION OF THE DRAWINGS

The foregoing summary, as well as the following detailed description, will be better understood when read with reference to the appended drawings, wherein:

FIG. 4 shows an example of a TA-ID information element (IE) included in an SIB transmitted by the eNodeB of FIG. 3; and FIG. 5 shows an example of an LTE system information block/element transmitted by the eNodeB of FIG. 3.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "evolved Node-B (eNodeB)" includes but is not limited to a base station, a site controller, an access point (AP), or any other type of interfacing device capable of operating in a wireless environment.

Given the agreement in LTE mobility area tracking that "there is only one common TA concept defined for RAN and CN in LTE/SAE", the tracking area concept replaces the current 3GPP routing area and UTRAN RA concepts and procedures. As a result, the LTE TAU procedure is a new procedure and therefore requires new mechanisms for support.

Figure 1:
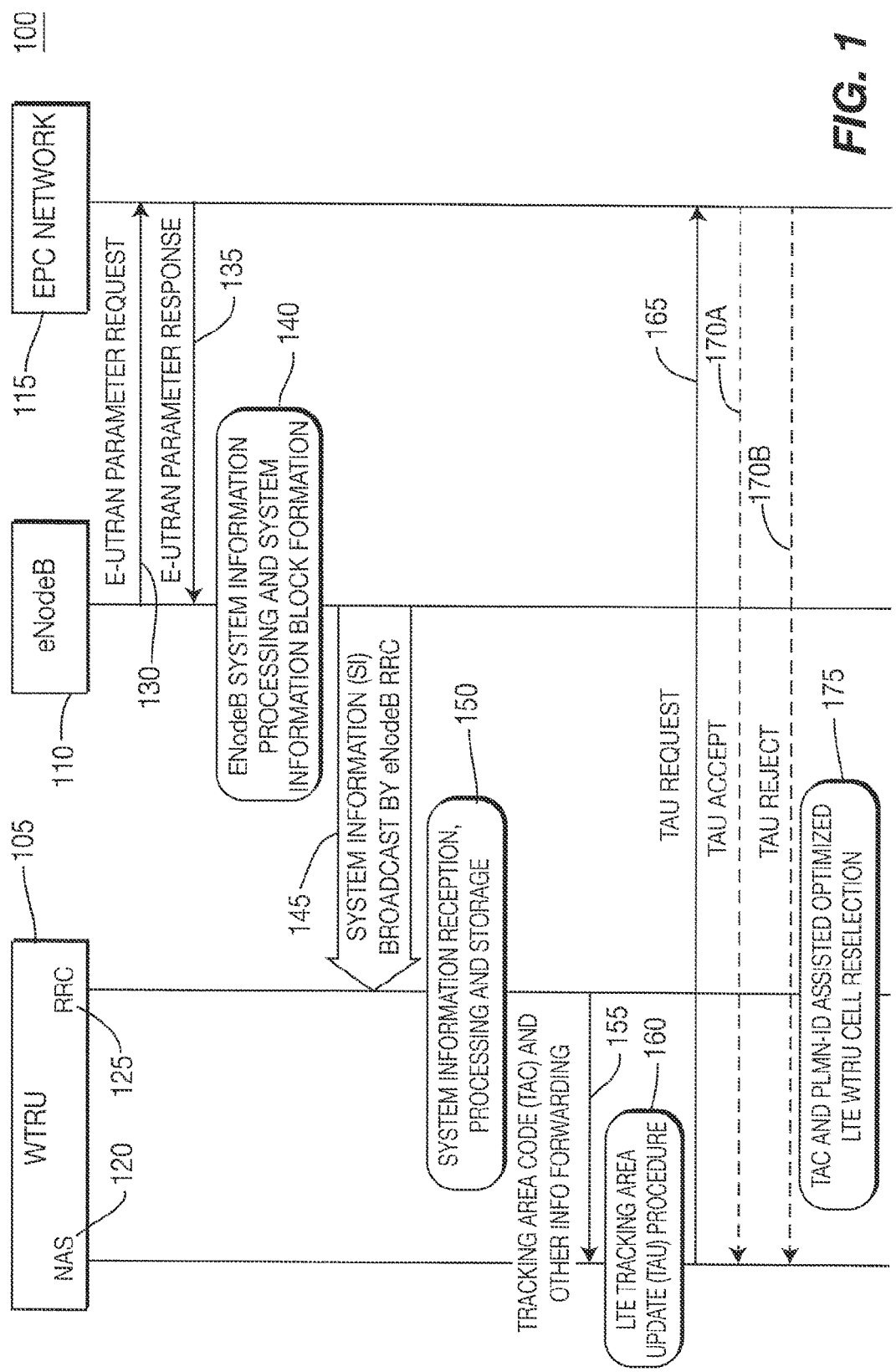
FIG. 1 is a signaling diagram of an LTE TAU and cell reselection procedure implemented in a wireless communication system including an eNodeB, an EPC network and a WTRU.

FIG. 1 is a signaling diagram of an LTE TAU and cell reselection procedure 100 that is implemented in a wireless communication system including a WTRU 105, an eNodeB 110 and an EPC network 115.

Figure 2:
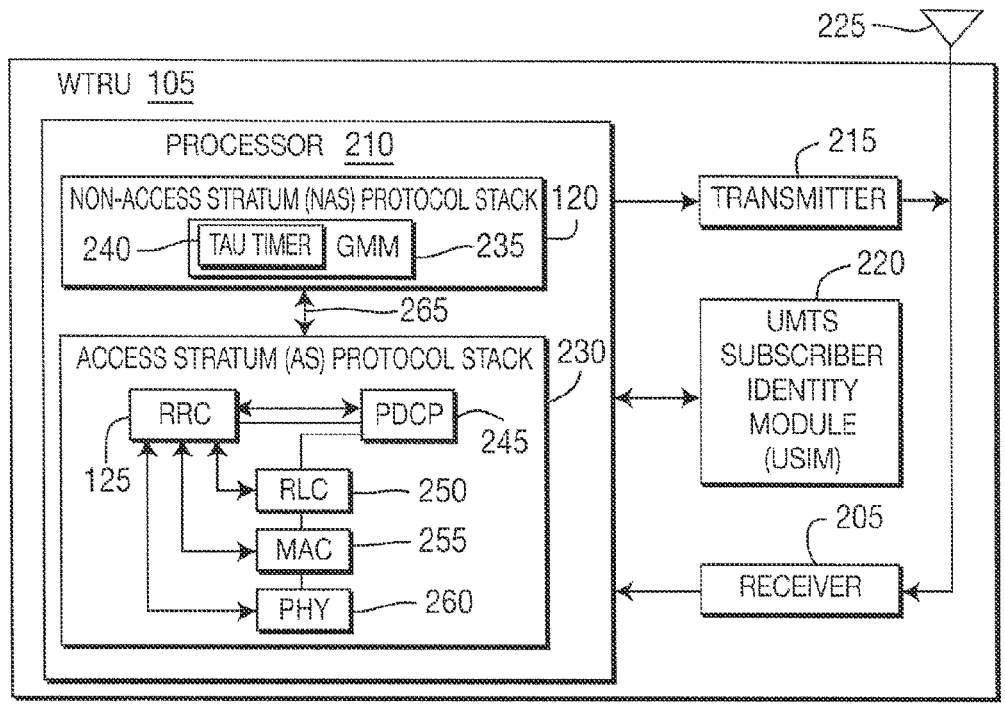
FIG. 2 is an example of a block diagram of the WTRU used to implement the LTE TAU and cell reselection procedure of FIG. 1.

FIG. 2 is an example of a block diagram of the WTRU 105 used to implement the LTE TAU and cell reselection procedure 100 of FIG. 1. The WTRU 105 may include a receiver 205, a processor 210, a transmitter 215, a USIM 220 and at least one antenna 225. The processor 210 may include a NAS protocol stack 120 and an access stratum (AS) protocol stack 230. The NAS protocol stack 120 may include a GMM 235 or its LTE equivalent unit. The GMM 235 may include a TAU timer 240. The AS protocol stack 230 may include an RRC unit 125, a packet data convergence protocol (PDCP) unit 245, a radio link control (RLC) unit 250, a medium access control unit (MAC) unit 255 and a physical layer (PHY) 260.

Figure 3:
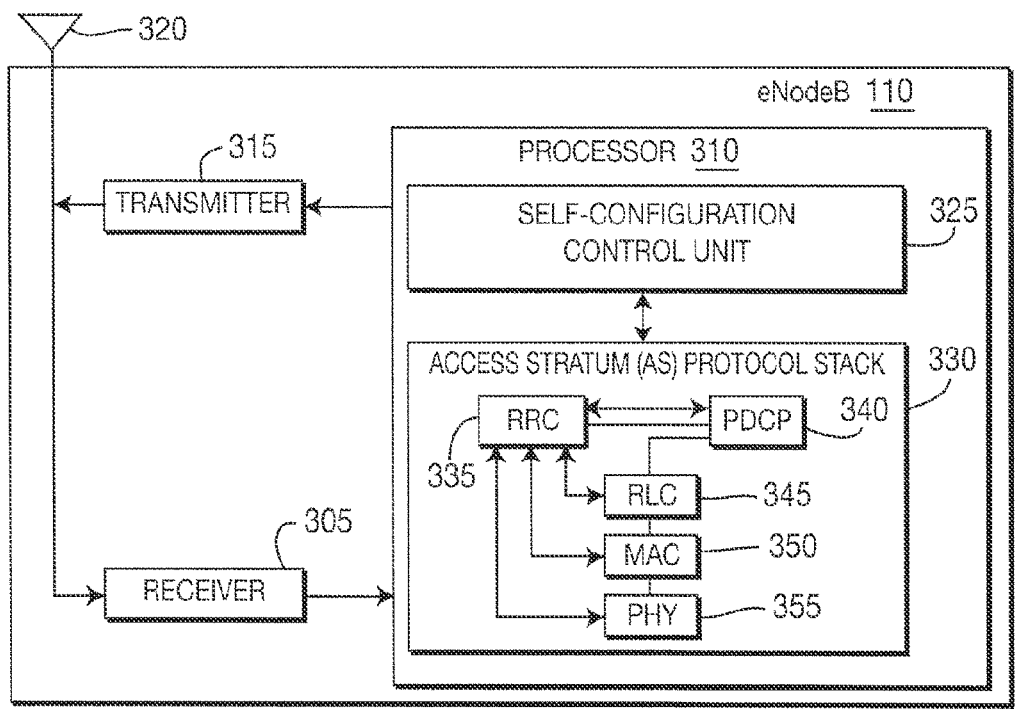
FIG. 3 is an example of a block diagram of the eNodeB used to implement the LTE TAU and cell reselection procedure of FIG. 1.

FIG. 3 is an example of a block diagram of the eNodeB 110 used to implement the LTE TAU and cell reselection procedure 100 of FIG. 1. The eNodeB 110 may include a receiver 305, a processor 310, a transmitter 315 and at least one antenna 320. The processor 310 may include a self-configuration control unit 325 and an AS protocol stack 330. The AS protocol stack 330 may include an RRC unit 335, a PDCP unit 340, an RLC unit 345, a MAC unit 350 and a PHY 355.

Referring to FIGS. 1 and 3, when the eNodeB 110 powers up, the processor 310 checks the connection/link of the eNodeB 310 with the EPC network 115, identifies the primary serving access gateway (aGW), (not shown), that serves the EPC network 115, and generates an E-UTRAN parameter request message 130 that is transmitted by the transmitter 315 via the antenna 320 of the eNodeB 110 to the EPC network 115, via the identified primary serving aGW. The E-UTRAN parameter request message 130 may contain information associated with other EPC network connections, (other than the primary serving aGW and EPC network 115 in the so-called network sharing environment), information associated with connections of the eNodeB 110 with other identified eNodeBs, and the radio and channel load capabilities of the eNodeB 110.

In response to receiving the E-UTRAN parameter request message 130, the EPC network 115 transmits an E-UTRAN parameter response message 135, which is received by the receiver 305 of the eNodeB 110, and is then processed by the self-configuration control unit 325 in the processor 310. The E-UTRAN parameter response message 135 may contain network area partitioning information, such as the location or tracking area IDs and their operating permissions (forbidden or not), and the policy the eNodeB 110 has to observe towards the connected EPC network 115, (i.e., network sharing or network node relocation), and towards other connected eNodeBs in terms of handover and load balancing operating policies.

In step 140 of FIG. 1, the self-configuration control unit 325 in the processor 310 of the eNodeB 110 commands the signaling actions with the EPC network 115, and summarizes information included in the E-UTRAN parameter response message 135 and other source information to form system information for the cell and the associated E-UTRAN. The self-configuration control unit 325 will then assemble the system information and format the SIBs, (e.g., combining/associating network/location area/cell-IDs into the proposed SIB and other SIBs). The RRC unit 335 in the AS protocol stack 330 of the eNodeB 110 is responsible for broadcasting the system information to the cell, and is also responsible for configuring each individual WTRU 105 in the cell for relevant operational RRC.

Now referring to FIGS. 1-3, the RRC unit 335 in AS protocol stack 330 of the eNodeB 110 then proceeds to broadcast system information to the whole cell via the PHY 355 of the AS protocol stack 330 in the processor 310, the transmitter 315 and the antenna 320 of the eNodeB 110 over the cell's broadcast channels (step 145 of FIG. 1). Each WTRU 105, (when powered up or moved to a new cell and having synchronized to a serving cell serviced by the eNodeB 110), will automatically tune to the broadcast channel, in fixed frequency location, code and time configuration, of the cell and start reading the system information available to all WTRUs in the cell via the antenna 225, the receiver 205 and the PHY 260 of the AS protocol stack 230.

In step 150 of FIG. 1, the RRC unit 125 of the WTRU 105 receives, processes, stores and commands the reading of system information received by the PHY 260 from the receiver 205, provides relevant information or parameter data to the GMM 235 in the NAS protocol stack 120 for mobility control, performs LTE cell reselection and configures the PDCP unit 245, the RLC unit 250, the MAC unit 255 and the PHY 260 for LTE E-UTRA data inputs and outputs, and other operations.

In step 155 of FIG. 1, based on the received system information, the RRC unit 125 then sends a TAC and other information to the GMM 235 in the NAS protocol stack 120 via an internal interface 265 between the AS protocol stack 230 and the NAS protocol stack 120.

In step 160 of FIG. 1, the NAS protocol stack 120 performs an LTE TAU procedure during which the GMM 235 in NAS protocol stack 120 performs a comparison of the TAC provided by the RRC unit 125, which represents the TA-ID of a new cell, against an existing TAC, which represents the TA-ID of a previous cell. Note that a single tracking area may cover many cells.

Referring to FIGS. 1-3, when the TAC indicates that the WTRU 105 is in a different tracking area, the NAS protocol stack 120 in the processor 210 of the WTRU 105 generates a TAU request message 165 including the TA-ID of the new cell, which is transmitted by the transmitter 215 via the antenna 225 to the EPC network 115. In response to receiving the TAU request message 165, the EPC network 115 sends either a TAU accept message 170A or a TAU reject message 170B to the WTRU 105, which is forwarded via the PHY 260, the MAC unit 255, the RLC unit 250, the PDCP unit 245 and the RRC unit 125 to the GMM 235 in NAS protocol stack 120 via the internal interface 265.

The TAU accept message 170A may contain the accepted TA-ID and, optionally, other TA-IDs for tracking areas that the WTRU 105 is allowed to operate in, (to reduce the need for performing additional TAU procedures). Optionally, these accepted TA-IDs may be used to remove a particular TA-ID in a "forbidden TA-ID list" stored in the GMM 235 if an accepted TA-ID matches the particular TA-ID.

The TAU reject message 170B may contain a cause/reason for the rejection upon which the operating state of the GMM 235 may be changed. The TAU reject message 170B may contain the rejected TA-ID, and optionally contain a list of other TAs that the WTRU 105 is not allowed to move into. The rejected TA-IDs may need to be added to the "forbidden TA-ID list" stored in the GMM 235 so that the WTRU 105 will not reselect to a cell under the TAs associated with these TA-IDs.

The RRC unit 125 in the WTRU 105 will then perform a TAC and PLMN-ID assisted optimized LTE WTRU cell reselection procedure 175 regularly. The cell reselection 175 shall not attempt to measure and reselect cells under the forbidden tracking areas (TA-IDs) in order to save processing and battery power.

In LTE, the RRC unit 335 in the eNodeB 110 still provides the mobility area management information, (i.e., the PLMN-IDs, the TACs and the cell-IDs), to one or more WTRUs 105 by broadcasting system information in a cell. The RRC unit 335 groups the mobility area IDs and network IDs together with cell IDs of the serving cell and neighboring cells to provide the associations of the LTE networks, TAs, and cells to WTRUs in order to supply the information for the LTE TA update as well as for the optimization of WTRU cell reselection with respect to the PLMN and TA information. Thus, the TA information to the cell and neighboring cells are grouped with PLMN information, to form a new LTE system information block or element for the association of the mobility areas and cells and network identities. The TA-ID, as used in the LTE TA update, needs to be defined and constructed.

The RRC unit 125 in the WTRU 105 receives system information broadcast by the eNodeB 110, relays the system information, (in particular the TAC), to the NAS protocol stack 120, utilizes the system information (association of network IDs, TACs and Cell-IDs) for implementing a TAU procedure and assists in performing the WTRU cell reselection process. The NAS protocol stack 120 utilizes the TAC provided by the RRC unit 125 for performing an LTE TAU procedure.

In LTE, the TAC is broadcast from the LTE system information to the relevant E-UTRAN cell and is used for the cell. Since it is also possible that one cell could belong to a number of TAs, or a WTRU could also be registered with multiple TAs, (where one cell belongs to one TA), one or more TACs may be included in the system information broadcast.

FIG. 4 shows an example of a TA-ID IE 400 that may be included in an SIB generated by the self-configuration control unit 325 in the processor 310 of the eNodeB 110. The TA-ID IE 400 may also be included in the TAU request message 165 or the TAU accept/reject messages 170A and 170B by the NAS protocol stack 120 in the WTRU 105, or its counterpart in the EPC network 115, to perform an LTE TAU procedure.

As shown in FIG. 4, the TA-ID IE 400 may include a coded 8-bit TA identification IE-ID field 405, and TAC fields 410, 415 and 420 that provide up to 24 bits of field width (typically the field width used is 16-24 bits). The octet position field 425 is the element type and has mandatory presence (MP), as indicated by field 430. The fields 432, 434, 436, 438, 440 and 442 represent the components of a normal PLMN. The labeled fields 444, 446 and 448 indicate the octet position of the components (432/434, 436/438 and 440/442) in the TA-ID IE 400. As indicated by field 450, the PLMN fields 432-448 have optional presence (OP), whereby x=1 when a PLMN is present, and x=0 if a PLMN is not present. Thus, when a PLMN is present, (x=1), fields 444, 446 and 448 indicate octet positions of 2, 3 and 4. Otherwise, when a PLMN is not present, (x=0), the fields 432-442 do not exist, and fields 444, 446 and 448 are ignored, since they would all indicate octet 1, which would be the same as field 425.

For example, if the TAC is globally unique regardless of which PLMN it belongs to, then the TA-ID is the same as the TAC, (see field 450, where it is indicated that the PLMN field does not exist when x=0). If the TAC is only assigned by each network operator, (i.e., the TAC is per PLMN), then the TA-ID=PLMN-ID+TAC, (see field 450, where it is indicated that the PLMN field is present when x=1), considering the roaming requirement.

The fields 410 and 415 represent a TAC and have MP, (corresponding to 16-bits), as indicated by fields 452 and 454. The field 420 represents the TAC continuation, (assuming that its width extends up to 24 bits), and has OP, as indicated by field 456. For example, if the TA-ID IE 400 does not include a PLMN, then it consists of fields 405, 410, 415 and 420. If the TA-ID includes a PLMN, then it consists of fields 405, 410, 415, 420, the mobile country code (MCC) digit fields 432, 434 and 436, and the mobile network code (MNC) digit fields 440, 442 and 444, which are in binary coded decimal (BCD) representation, (i.e. a 4-bit field with binary coding for digits 0-9, e.g., '1001' represents a 9).

FIG. 5 shows an LTE SIB, (or system information element), 500 used for E-UTRAN TAU and for E-UTRAN mobility area identification management information. The E-UTRAN SIB 500 of FIG. 5 is formed by the eNodeB 115 grouping the mobility area IDs and the available network IDs together as a clustered E-UTRAN SIB for broadcast in a cell. The various IDs and their associations provide the static/permanent or long term associations of the networks, the tracking areas with respect to all the cells in the neighborhood that the operations of the WTRU 105 may encounter. Note that this is independent of the neighboring cell information list, which is affected by the operational status of those neighboring cells, (sometimes available and sometimes not, due to problems with the EPC network 115 or the eNodeB 110), which will also bear other cell reselection information not relevant here.

This E-UTRAN SIB first lists the ID associations with respect to the serving cell. The IDs may be the multiple TAs associated with the serving cell in the "overlapping TAs" scheme, or the one TA with the "multiple TAs registration" scheme, as indicated by field 505.

The neighboring cells are then listed with the PLMN-ID and the associated TA-ID(s) sorted with the TA-IDs shown in the serving cell TA-IDs list first.

The information element (IE) list, (E-UTRAN mobility area information with neighboring cells in the system information block), also positions the cells (by cell-IDs) with similar PLMN-IDs together/adjacent for SIB signaling size reduction. Note that in FIG. 5, the PLMN-ID and the TAC are separated to save signaling space. The WTRU 105 may construct the TA-ID from them if the TA-ID=PLMN-ID+TAC. Otherwise, the TA-ID=TAC.

The LTE SIB, (or system IE), 500 of FIG. 5 combines/groups the LTE cell-ID, TA-ID, (shown as the TAC), and the PLMN-ID together to provide convenient guidance for the WTRU 105 to process, i.e. to evaluate the neighboring cells with this network/tracking-area/cell association information for determining whether a reselection to a certain neighboring cell should be performed.

The invention builds maximum flexibility into the table representation of FIG. 5 to suit two competing schemes of TA assignment to a cell, (i.e., the "multiple TAs registration" and the "overlapping TAs"), as indicated by field 505. For the first "multiple TA" scheme, one serving cell will only be assigned to one TA, but multiple TAs can be assigned to a WTRU at the TAU time. For the second "overlapping TAs" scheme, a serving cell can be assigned to multiple TAs and the "maxTAsToACell" value in FIG. 5 will be one, (i.e., one TA is assigned to a cell).

Referring to FIG. 5, column 510 indicates the information element name/group name. The "need" column 515 indicates the presence code (MP/OP) of the component there when formatting a message using this information block/element. The "multi" column 520 indicates whether multiple same component/element (but different value) has been put there to have a one-to-many-association. The "type and reference" column 525 provides further details/decomposition of a component/element in other element place. The "semantics" column 530 indicates how to format or process the element.

The LTE SIB, (or system IE), 500 shown in FIG. 5 has a static or non-primary nature, whereby static means that it is not changing often with time, and non-primary means it is not to be broadcast via the primary broadcast channel (P-BCH) in LTE, and is broadcast through the dynamic broadcast channel (D-BCH) to the serving cell. This LTE SIB or system information element shall be read by the WTRU 105 in the LTE_IDLE mode and is mainly used while the WTRU 105 is in LTE_IDLE state The LTE SIB is associated with a particular serving cell.

The RRC unit 125 of the WTRU 105 reads this system information block (SIB) while in an LTE_IDLE when a new cell is entered. Frequent re-reading of this SIB is not necessary unless the cell indicates changes to this SIB. When the RRC unit 125 in the WTRU 105 has received the LTE system information broadcast about the serving cell's TACs, the RRC unit 125 may either pass the TAC(s) associated with the current serving cell to the NAS protocol stack 120 via the internal interface 265 and let the GMM 235 handle the TAU exclusively, or check the listed TAC(s) in the new serving cell against the currently used TAC(s) via the previous TAU. If one of the new TAC(s) matches the currently used one, (or one of the currently registered TAs), the TA boundary is not crossed and a TAU is not required. Thus, the RRC can just hold the information. Otherwise, if there are no TACs matching, then the TAC(s) must be passed up to the NAS protocol stack 120 and let NAS protocol stack 120 perform the TAU. The purpose is to reduce the signaling/interaction overhead between the RRC unit 125 and the NAS protocol stack 120.

Meanwhile, the RRC unit 125 of the WTRU 105 uses the associations of the PLMN-IDs, TACs and Cell-IDs broadcast in the SIB of FIG. 5 for optimizing the WTRU cell reselection measurement and cell reselection ranking and decision process.

Measurement candidate cells shall be ordered with those cells in the front order: 1) those cells with H-PLMN; and those cells with the favorable TAC(s) (favorable TA(s) are those that the WTRU is currently registered with or those TAs that covers the previous cell from which the WTRU enters the new cell). Cells with favorable TACs (from the current TA's point of view) shall be in the front order for measurement scheduling with respect to the intra-frequency, inter-frequency, or in another radio access technology (RAT) measurements. Cells with favorable TAC(s) shall be ranked higher if the measured signal strength and other evaluation criteria are about the same with respect to those cells not possessing favorable TAC(s). The goal is to avoid the situation that a WTRU LTE cell reselection into a neighboring cell unnecessarily crossing the TA or group TA boundary and then an unnecessary LTE TAU has to be performed.

The GMM 235 of NAS protocol stack 120 in the WTRU 105 will perform TAU related operations if the TA entered by the WTRU 105 does not belong to a list of forbidden TAs. The forbidden TA list identifies one or more TAs that the WTRU 105 is not allowed to move into. The list may optionally be stored in the USIM 220 of the WTRU 105 when the WTRU 105 is powered off. When the WTRU is powered on, the list is loaded into the GMM 235. The list may be modified by the TAU accept message 170A or the TAU reject message 170B.

Tracking Area change detected: If the TAC or TACs forwarded by the RRC do not have any single one matching the current TAC(s) or TA-ID(s) granted by the previous TAU accept message or by the retrieved TA-ID from the USIM 220 in the beginning of the WTRU power up, the NAS protocol stack 120 in the WTRU 105 shall initiate a TAU request or an attach effort in order to report its TA location to the EPC network 115.

Periodic TAU: If the TAU timer 240 in the WTRU 105 indicates that a time period established for performing periodic TAUs has expired, the NAS protocol stack 120 in the WTRU 105 triggers a TAU to the EPC network 115. When the WTRU 105 is in an LTE_IDLE state, the TAU timer 240 may, for example, be set within a range of 12 to 15 minutes or other values. If a TAU reject message 170B is received, the subsequent TAU request(s) are administered by setting the TAU timer 240 to a much shorter range of 10-15 seconds or other values, in order to register with another TA to receive paging.

In the TAU, the WTRU 105 may also update the EPC network 115 with its radio access and/or security capability. The WTRU 105 may negotiate discontinuous reception (DRX) or update of connection context (such as the packet data protocol (PDP) context) with the EPC network 115. DRX is a parameter which determines how often the WTRU 105 in idle mode shall wake up to monitor a paging channel for possible incoming calls. Note that the entries in the list of forbidden TAs are from two sources: the USIM device 220 and the TAU reject message 170B. The TAU reject message 170B is sent to the WTRU 105 if the EPC network 115 does not allow the WTRU 105 to obtain service from a reported tracking area. The TAU reject message 170B may contain one or more IDs of rejecting TAs, if needed to also guide the WTRU 105 in making cell reselection choices. These rejected TA-IDs are added to the forbidden TA list.

Although the features and elements are described in the embodiments in particular combinations, each feature or element can be used alone without the other features and elements of the embodiments or in various combinations with or without other features and elements of the invention. The methods or flow charts provided herein may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for communicating a tracking area identity, the method comprising:
   receiving system information comprising a system information block (SIB), wherein the SIB comprises a mobile country code (MCC), a mobile network code (MNC), and a tracking area code (TAC);
   identifying a tracking area of a new cell using the TAC;
   detecting, based on the SIB, whether the TAC matches one of a plurality of currently registered tracking areas;
   determining that the TAC does not match one of a plurality of tracking areas located on a forbidden tracking area list;
   generating a tracking area update (TAU) request message upon detecting that the TAC does not match one of the plurality of currently registered tracking areas; and
   transmitting the TAU request message;
   receiving a TAU Accept Message, wherein the TAU Accept Message comprises a list of accepted tracking areas; and
   removing at least one tracking area from the forbidden tracking area list based on the at least one tracking area being included in the list of accepted tracking areas.

2. The method of claim 1, wherein the MCC comprises a first MCC digit, a second MCC digit and a third MCC digit, and wherein the MNC comprises a first MNC digit, a second MNC digit and a third MNC digit.

3. The method of claim 2, wherein the SIB includes a plurality of octets, and each octet of the plurality of octets contains 8 bits and is in binary coded decimal (BCD) representation.

4. The method of claim 3, wherein the plurality of octets comprise a first octet including the second MCC digit and the first MCC digit, a second octet including the third MNC digit and the third MCC digit, and a fourth octet including the third MNC digit and the first MNC digit.

5. The method of claim 1, further comprising:
   identifying a second new cell, wherein the second new cell belongs to the tracking area included in the forbidden tracking area list; and
   determining that the second new cell is an unsuitable cell for cell reselection based on the tracking area being included in the forbidden tracking area list.

6. A wireless transmit/receive unit (WTRU) comprising:
   at least one antenna;
   a receiver coupled to the at least one tracking area antenna, the receiver configured to receive system information comprising a system information block (SIB) via the at least one antenna, wherein the SIB comprises a mobile country code (MCC), a mobile network code (MNC), and a tracking area code (TAC);
   a processor coupled to the receiver, the processor configured to identify a tracking area of a new cell using the TAC, detect, based on the received system information, whether the TAC matches one of a plurality of currently registered tracking areas, determine that the TAC does not match one of a plurality of tracking areas located on a forbidden tracking area list, and generate a tracking area update (TAU) request message when the processor detects that the TAC does not match one of the plurality of currently registered tracking areas;
   a transmitter configured to transmit the TAU request message to an evolved Node B (eNB) via the at least one antenna;
   the receiver further configured to receive a TAU Accept Message, wherein the TAU Accept Message comprises a list of accepted tracking areas; and
   the processor further configured to remove at least one tracking area from the forbidden tracking area list based on the at least one tracking area being included in the list of accepted tracking areas.

7. The WTRU of claim 6, wherein the MCC comprises a first MCC digit, a second MCC digit and a third MCC digit, and wherein the MNC comprises a first MNC digit, a second MNC digit and a third MNC digit.

8. The WTRU of claim 7, wherein the SIB includes a plurality of octets, and each octet of the plurality of octets contains 8 bits and is in binary coded decimal (BCD) representation.

9. The WTRU of claim 8, wherein the plurality of octets comprise a first octet including the second MCC digit and the first MCC digit, a second octet including the third MNC digit and the third MCC digit, and a third octet including the second MNC digit and the first MNC digit.

10. The WTRU of claim 6, wherein the processor is further configured to identify a second new cell, wherein the second new cell belongs to the tracking area included in the forbidden tracking area list, and to determine that the second new cell is an unsuitable cell for cell reselection based on the tracking area being included in the forbidden tracking area list.

* * * * *